United States Patent Office 2,697,121
Patented Dec. 14, 1954

2,697,121

PROCESS FOR THE PREPARATION OF CUMENE HYDROPEROXIDE

Michel Marius Mosnier and Andre Fournet, Lyon, France, assignors to Societe Des Usines Chimiques Rhone-Poulenc, Paris, France, a French body corporate No Drawing. Application April 11, 1952, Serial No. 281,892

Claims priority, application France April 28, 1951

4 Claims. (Cl. 260—610)

This invention relates to a process for the preparation of cumene hydroperoxide.

Cumene hydroperoxide was first described by Hock & Lang (Berichte der Deutschen Chemischen Gesellschaft, vol. 77, p. 254, 1944) who prepared it by oxidising cumene with molecular oxygen in the presence of ultra-violet rays at 85° C. Under these conditions, however, the oxidation proceeds very slowly and, in fact, the above-mentioned authors obtained a conversion of only about 6 per cent in 24 hours. It is known that the reaction can be accelerated to some extent by the addition of substances exhibiting a strongly basic reaction, hence acid compounds would not be expected to possess any value in this respect. It has now been found, however, that benzoic acid is a very useful accelerator for this oxidation which increases the speed of reaction without reducing the yield or the quality of the product.

Accordingly, the present invention provides a process for the preparation of cumene hydroperoxide which comprises oxidising cumene with molecular oxygen, or a gas containing molecular oxygen, in the presence of benzoic acid.

The oxidation is carried out in the usual manner for the preparation of hydroperoxides from hydrocarbons using air or oxygen. The proportion of benzoic acid required is very small and it is preferred to use proportions of the order of 0.5 g. to 1 g. of benzoic acid per kilogram of cumene.

The benzoic acid is advantageously added portionwise during the course of the reaction. Also, in accordance with known practice in oxidations of this type, the oxidation can be initiated by adding a small proportion of cumene hydroperoxide, for example the product of a previous operation.

The invention is illustrated by the following examples:

Example I 220 litres per hour of air at a pressure of 12 kg. per sq. cm. are bubbled into 2700 cc. of cumene heated to 110° C. to which 68 g. of cumene hydroperoxide have been added in order to eliminate the induction period.

In a parallel experiment, 0.5 g. of benzoic acid is added at the commencement, 0.2 g. after the first two hours, and 0.2 g. is then added at intervals of three hours.

A small sample is taken every hour, from which the hydroperoxide content is determined by iodimetry. At the end of the experiment, the unconverted cumene is evaporated off, the proportion of hydroperoxide in the residue is determined and the content of secondary oxidation products ascertained by difference.

The results are given in the following table in grams of cumene hydroperoxide per 100 cc.; column A shows the total weight of cumene hydroperoxide formed in each experiment and column B shows the weight of cumene hydroperoxide formed per hour in each experiment. The last two lines give the proportion of cumene hydroperoxide in the product and the percentage of secondary products respectively.

| Hours | Experiment without benzoic acid | | Experiment with benzoic acid | |
|---|---|---|---|---|
| | A | B | A | B |
| 0 | 2.5 | | 2.5 | |
| 1 | 5.4 | 2.9 | 6.0 | 3.5 |
| 2 | 7.7 | 2.3 | 10.3 | 4.3 |
| 3 | 10.0 | 2.3 | 14.8 | 4.5 |
| 4 | 11.7 | 1.7 | 20.5 | 5.7 |
| 5 | 12.4 | 0.7 | 26.1 | 5.6 |
| Product | 91% | | 94.3% | |
| Secondary Products | 9% | | 5.7% | |

These tests show that in the presence of benzoic acid the speed of oxidation of the cumene is more than doubled and that the formation of secondary oxidation products is considerably reduced.

Example II

The operation is carried out as in Example I, but with oxygen (60 litres per hour) at atmospheric pressure. 0.2 g. of benzoic acid was added at the commencement, followed by 0.1 g. every hour. The quantity of hydroperoxide added at the commencement as initiator in these tests was 86 g. The results are given in the following table in which the headings have the same meaning as before.

| Hours | Experiment without benzoic acid | | Experiment with benzoic acid | |
|---|---|---|---|---|
| | A | B | A | B |
| 0 | 3.2 | | 3.2 | |
| 1 | 5.8 | 2.6 | 7.7 | 4.5 |
| 2 | 7.4 | 1.6 | 12.0 | 4.3 |
| 3 | 9.1 | 1.7 | 16.8 | 4.8 |
| 4 | 11.0 | 1.9 | 21.6 | 4.8 |
| 5 | 12.7 | 1.7 | 26.1 | 4.5 |
| 6 | 14.3 | 1.6 | 30.7 | 4.6 |
| 7 | 16.1 | 1.8 | 35.2 | 4.5 |
| Product | 90.5% | | 90.9% | |
| Secondary Products | 9.5% | | 9.1% | |

In this experiment, the speed of oxidation in the presence of benzoic acid was again more than doubled.

We claim:

1. A process for the preparation of cumene hydroperoxide which comprises heating cumene with molecular oxygen in the presence of 0.08 to 1.0 g. of benzoic acid per kilogram of cumene.

2. A process according to claim 1 wherein the proportion of benzoic acid present is of the order of 0.5 to 1.0 g. per kilogram of cumene.

3. A process for the preparation of cumene hydroperoxide which comprises heating cumene with a gas containing molecular oxygen in the presence of benzoic acid in a proportion of 0.5 to 1.0 g. of benzoic acid per kilogram of cumene.

4. A process for the preparation of cumene hydroperoxide which comprises heating cumene with air in the presence of benzoic acid in a proportion of 0.5 to 1.0 g. of benzoic acid per kilogram of cumene.

References Cited in the file of this patent

UNITED STATES PATENTS

| Number | Name | Date |
|---|---|---|
| 2,613,227 | Joris | Oct. 7, 1952 |

FOREIGN PATENTS

| Number | Country | Date |
|---|---|---|
| 496,062 | Belgium | June 15, 1950 |
| 477,824 | Canada | Oct. 16, 1951 |